United States Patent
Earle

(10) Patent No.: US 9,521,459 B2
(45) Date of Patent: Dec. 13, 2016

(54) METHOD AND SYSTEM FOR DELIVERING VIDEO CONTENT FROM MULTIPLE PLATFORMS TO SUBSCRIBERS

(71) Applicant: aioTV, Inc., Centennial, CO (US)

(72) Inventor: Michael Everett Earle, Centennial, CO (US)

(73) Assignee: AIOTV, INC., Centennial, CO (US)

( * ) Notice: Subject to any disclaimer, the term of this patent is extended or adjusted under 35 U.S.C. 154(b) by 147 days.

(21) Appl. No.: 13/973,902

(22) Filed: Aug. 22, 2013

(65) Prior Publication Data

US 2015/0058872 A1 Feb. 26, 2015

(51) Int. Cl.
| | |
|---|---|
| *H04N 7/16* | (2011.01) |
| *H04H 60/32* | (2008.01) |
| *H04N 21/462* | (2011.01) |
| *H04N 21/482* | (2011.01) |
| *H04N 21/2665* | (2011.01) |

(Continued)

(52) U.S. Cl.
CPC .... *H04N 21/4622* (2013.01); *H04N 21/25808* (2013.01); *H04N 21/25841* (2013.01); *H04N 21/25875* (2013.01); *H04N 21/25891* (2013.01); *H04N 21/2665* (2013.01); *H04N 21/26258* (2013.01); *H04N 21/44222* (2013.01); *H04N 21/4782* (2013.01); *H04N 21/4821* (2013.01); *H04N 21/4825* (2013.01);

(Continued)

(58) Field of Classification Search
CPC ............ H04N 21/4622; H04N 21/4821; H04N 21/2665; H04N 21/4782; H04N 21/6125; H04N 21/6175; H04N 21/25808; H04N 21/25841;H04N 21/25891; H04N 21/26258; H04N 21/25875; H04N 21/44222; H04N 21/4825; H04N 21/4828

See application file for complete search history.

(56) References Cited

U.S. PATENT DOCUMENTS

| | | |
|---|---|---|
| 8,005,838 B2 | 8/2011 | Van Flandern et al. |
| 8,015,580 B2 | 9/2011 | Poling, Jr. et al. |

(Continued)

OTHER PUBLICATIONS

"aioTV launches aioCloud and aioPro, enabling Providers to offer a branded OTT experience in 24 hours at no cost", aioTV press release posted Mar. 21, 2012, 1 page, printed from internet Jun. 26, 2013, www.aio-tv.com.

(Continued)

*Primary Examiner* — Oschta Montoya
(74) *Attorney, Agent, or Firm* — Fox Rothschild LLP

(57) ABSTRACT

An integrated content delivery interface enables a user to access content from a multi-channel service provider (such as a cable television service) and over-the-top sources. The system displays a set of cable channels and over-the-top channels based on a combination of the user's subscription status for the various services, personalization criteria, and device type. The system may provide the user with a playlist of available videos for each channel. For videos from over-the-top sources, when a user selects the video for on-demand play the user's device will directly access the video as served by the over-the-top source. Before including any video in the playlist, the system will ensure that the video is available to the user based on subscription status and/or device type, and it will ensure that the over-the-top source serves the video in a format that is compatible with the user's device.

20 Claims, 6 Drawing Sheets

(51) Int. Cl.
*H04N 21/4782* (2011.01)
*H04N 21/61* (2011.01)
*H04N 21/258* (2011.01)
*H04N 21/262* (2011.01)
*H04N 21/442* (2011.01)

(52) U.S. Cl.
CPC ..... *H04N 21/4828* (2013.01); *H04N 21/6125* (2013.01); *H04N 21/6175* (2013.01)

(56) References Cited

U.S. PATENT DOCUMENTS

| | | |
|---|---|---|
| 8,667,549 B2 | 3/2014 | Reneris |
| 2004/0117838 A1 | 6/2004 | Karaoguz et al. |
| 2005/0132409 A1 | 6/2005 | Perlman |
| 2007/0192791 A1 | 8/2007 | Sullivan et al. |
| 2008/0168132 A1* | 7/2008 | Chun .......................... 709/203 |
| 2009/0076898 A1 | 3/2009 | Wang et al. |
| 2009/0144768 A1 | 6/2009 | Nagaraja |
| 2009/0178089 A1 | 7/2009 | Picco et al. |
| 2010/0199312 A1 | 8/2010 | Chang et al. |
| 2011/0078734 A1 | 3/2011 | Lee |
| 2011/0246620 A1 | 10/2011 | Miller, Jr. |
| 2012/0099024 A1 | 4/2012 | Ryu et al. |
| 2012/0110621 A1* | 5/2012 | Gossweiler, III ............... 725/46 |
| 2012/0173383 A1 | 7/2012 | Badawiyeh et al. |
| 2012/0233640 A1* | 9/2012 | Odryna .............. H04N 21/4622 725/45 |
| 2012/0331293 A1 | 12/2012 | Ma et al. |
| 2013/0152139 A1 | 6/2013 | Davis et al. |
| 2013/0198774 A1 | 8/2013 | Massicotte et al. |
| 2013/0305274 A1 | 11/2013 | Gavita et al. |
| 2013/0305287 A1 | 11/2013 | Wong et al. |
| 2014/0052740 A1 | 2/2014 | Fleischman et al. |
| 2014/0109144 A1 | 4/2014 | Asnis et al. |
| 2014/0115633 A1 | 4/2014 | Selim et al. |
| 2014/0130099 A1 | 5/2014 | Kunisetty |
| 2014/0282734 A1* | 9/2014 | Stern .................. H04N 21/4622 725/48 |

OTHER PUBLICATIONS

"Fan TV is a moonshot to fix the TV Experience", CNET Reviews, May 30, 2013, 3 pages, printed from internet Jun. 26, 2013.
Snider, "Fan TV aims to put all viewing options in one remote", Jun. 1, 2013, USA Today, 1 page, printed from internet, www.usatoday.com.
G-Box Midnight, Community Portal, 2 pages, printed from internet Jun. 26, 2013, www.matricom.net/products/g-box-midnight-mx2.

* cited by examiner

METHOD AND SYSTEM FOR DELIVERING VIDEO CONTENT FROM MULTIPLE PLATFORMS TO SUBSCRIBERS

RELATED APPLICATIONS AND CLAIM OF PRIORITY

This patent document is related to U.S. patent application Ser. No. 13/973,887, titled "Integrated Cable and Over-The-Top Video Content Delivery System"; and U.S. patent application Ser. No. 13/973,915, titled "Method and System for Creating Video Channels for Delivery of Content from Multiple Platforms"; each of which was filed on the filing date of this application. The disclosures of each application are fully incorporated herein by reference.

BACKGROUND

Consumers of on-demand video content today have an ever-growing number of content sources available to them, and they want to receive that content easily on a wide variety of devices. Content providers such as cable television service providers want to reach these consumers, but content licensing restrictions may prohibit the service providers from providing their subscribers with all content in any location on any device. Depending on the owner of the content, the provider may only be able to make the content available for on-demand viewing in certain geographic regions, via licensed devices. However, because of an inability to manage the licensing rights, cable television service providers may limit the content and/or the means of access that they make available to their subscribers.

In addition, various Internet-based video sources may deliver content in a manner that is optimized for one device (such as a smart phone), but whose viewing quality is not optimal for another device (such as an Internet-connected gaming device that is connected to a high definition television). This can lead to frustration for consumers, as well as loss of customers by cable service providers.

This document describes improved methods and systems for delivering video content from multiple platforms to subscribers.

SUMMARY

In an embodiment, a method and system for providing both cable and over-the-top videos to a subscriber includes a processor, one or more data storage facilities containing data about available video assets, and memory containing programming instructions that cause a content delivery interface to be presented to a subscriber on a display of an electronic device. The content delivery interface includes a first set of user-selectable channels that are served by a multi-channel video service provider and a second set of user-selectable channels that are served by over-the-top video content sources that are not under any control of the service provider. When the system receives a user selection of a channel, it may select (either based on programming instructions or in response to a user selection) a first video asset from a playlist of available video assets for the channel, and it may present the video asset to the user via the interface such as by including a thumbnail image, a title, or other identification information for the asset. If the user desires to watch the video asset, the system may identify a device type for the electronic device, determine a delivery address for an over-the-top video source from which the first video asset may be served in a format that is compatible with the device type, and enable the first video as served from the over-the-top source's delivery address to be presented to the user via the interface.

In some embodiments, the system may generate the playlist by identifying a set of available video assets to be candidates for inclusion in the playlist while filtering any assets that are not available from any delivery address from which the filtered asset may be served in a format that is compatible with the device type. The system also may determine a geographic location for the device and, for any asset associated with a geographic rule, it may determine whether the current location satisfies the rule, and include the asset in the playlist only if the device's current location satisfies the asset's associated geographic rule. In addition, if personalization data is available for the user, then when selecting videos for inclusion in the playlist the system may access a video content database containing metadata for candidate video assets and select those assets that satisfy one or more of the personalization criteria.

Optionally, the system may receive new content on a periodic basis from one or more of the over-the-top video sources, and it may update the playlist to replace older content with the new content.

In some embodiments, the user may provide the system with connection information for a social media feed. If so, the system may monitor the social media feed to identify any video assets that are linked in the feed and create a playlist comprising identifying information for the recently-linked video assets from the feed. In response to a user selection of a channel that contains the playlist, the system may cause the sequence of recently-linked video assets as served by over-the-top video content sources to be presented to the user via the interface. Similarly, the system may receive user subscription information for a third party video content source, monitor the third party video content source to identify any new video assets that are made available to the user, and create a playlist comprising identifying information for new video assets from the third party video source. In response to a user selection of a channel that contains the playlist, the system may cause the sequence of new video assets as served by the third party video content source to be presented to the user via the interface.

In some embodiments, the system may present a search field to a user, receive a search query via the search field, cause a search service to identify responsive video assets from over-the-top content sources, and create a playlist comprising identifying information for a sequence of the responsive video assets from the feed. When a user selects a channel that contains the playlist, the system may cause information identifying the sequence of the responsive video assets as served by over-the-top video content sources to be presented to the user via the user interface.

In some embodiments, the system may select the first set of user-selectable channels by accessing a profile for the user, identifying a package of channels to which the user subscribes, and designating the first set of channels as those channels served by the multi-channel service provider as part of the package. The system may select the second set of user-selectable channels based on user profile data so that at least one of the second set of user-selectable channels includes an over-the-top content source for which the user profile includes an authentication credential.

In an alternate embodiment, a system for providing video content to a subscriber includes a computer-readable medium comprising programming instructions that, when executed, cause a processor to implement a content delivery interface at an electronic device. The interface presents a user with a first set of user-selectable channels that are served by a multi-channel video service provider and a second set of user-selectable channels that are served by over-the-top video content sources that are not under any control of the service provider. The system receives a user selection of a channel, identifies a device type for the electronic device and generates a playlist. Playlist generation may include: identifying a set of video assets that are available for the channel; selecting, from the set of video assets, a subset of the video assets that satisfy one or more personalization criteria; and removing from the subset any video assets that are not available from any delivery address in a format that is compatible with the device type. The system may include any remaining video assets in the subset in the playlist and present the playlist to the user. When the system identifies a video from the playlist to present to the user via the electronic device, it will determine a delivery address from which the video may be served in a format that is compatible with the device type, and it will cause the first video as served from the delivery address to be presented to the user via the interface.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

This document describes a system that integrates video content from a cable television service provider and one or more over-the-top sources. This document uses the term "cable television service provider" or simply "service provider" to refer to a service provider that distributes multiple broadcast and subscription-based video channels to subscribers. The cable television service provider may supply the channels via radio frequency (RF) signals transmitted through a network of coaxial and/or fiber optic cables, via direct broadcast satellite transmissions, or by other delivery means. Thus, when this document uses the term "cable television service provider," it is intended to include all such subscription-based providers including traditional cable television providers, satellite television providers and the like.

An "over the top" (OTT) source is a common term used to refer to a source of video content that is not affiliated with the cable television service provider, but the service provider may facilitate access to the OTT source by its subscribers. OTT sources typically provide digital video signals via digital communication networks such as the Internet.

Figure 1:
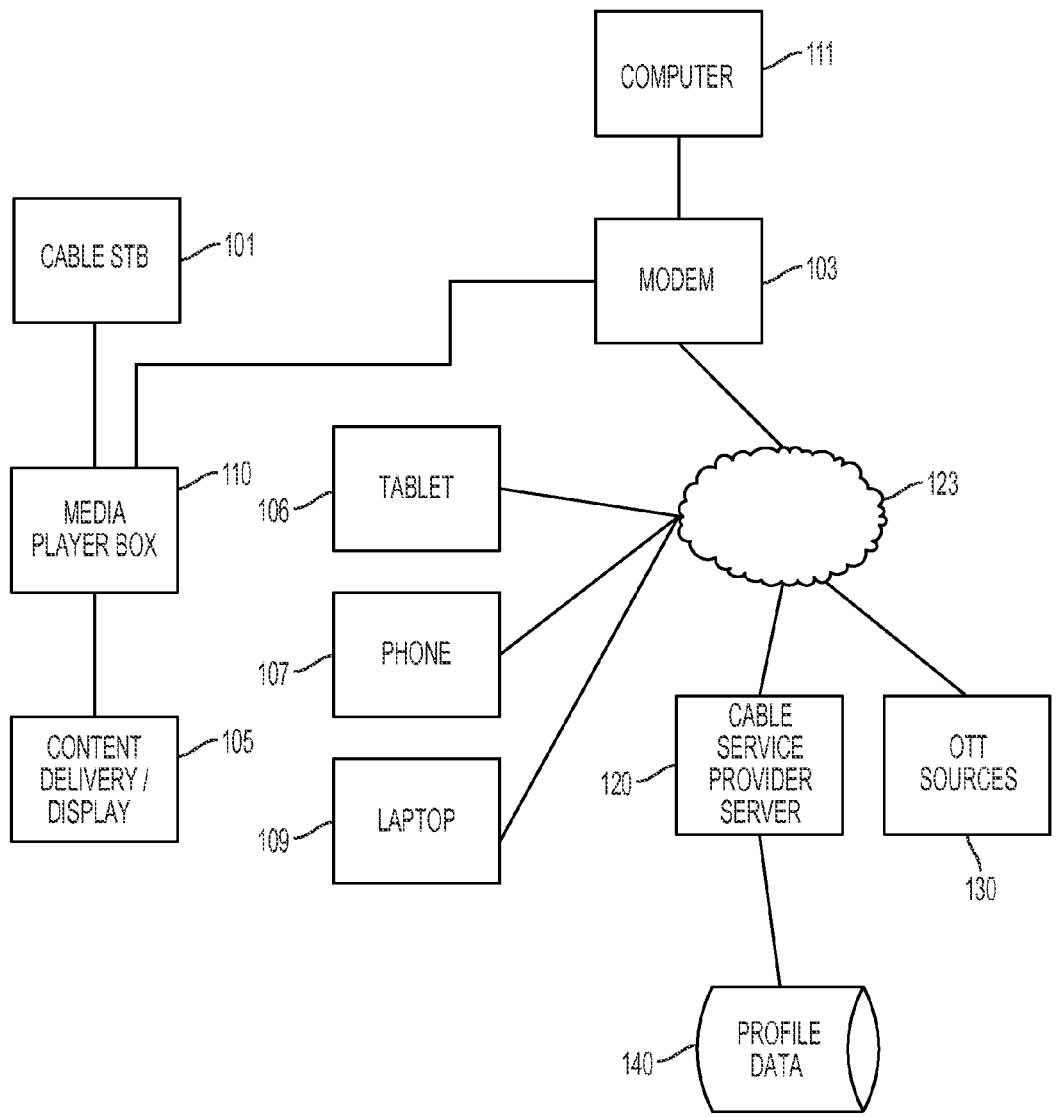
FIG. 1 is a block diagram that illustrates various elements that may be included in an integrated video content delivery system.

FIG. 1 illustrates an example of various components of a system for integrating cable and OTT content. Video content is made available to the consumer via one or more communications networks 123 such as the Internet and/or a cable television service provider network. The video content may be served by a cable service provider data server 120 and any number of OTT content sources 130 through the communications network 123.

The consumer may receive the content delivered through the networks via any number of devices. For example, the consumer may receive content via a computer 111 that is connected to the network via a modem 103 or equivalent communication interface. The consumer also may receive content served to a content delivery device 105 such as a television, computing device or other electronic device having a display. The cable service provider may deliver the content to the consumer's device via a cable set-top box 101. The set-top box 101 may be a separate device from the content delivery device 105, or it may comprise one more hardware components that are integrated into the content delivery device 105. The consumer also may view OTT content on the display 105, and a media player box 110 may provide the consumer with a display interface that integrates the cable service provider's content and the OTT content. In addition, the consumer may receive content via any number of wired or wireless electronic video player devices such as a tablet 106, smartphone 107, laptop computer 109 or any other video player such as a gaming machine or wireless-enabled television. Any or all of the electronic communication provided to any of the devices described above may be via a wired connection and/or a wireless connection such as a mobile phone network, wi-fi or other long range, short range or near field communications network.

The system also may include a data storage facility containing profile data 140 for one or more subscribers of a service, such as cable television service providers. The profile data 140 may include information such as subscriber authentication information that can be used to verify that a user who accesses the system is actually a subscriber, user preference information such as services and/or playlists that the user has selected to display on various screens (as will be described below). The profile data 140 also may include subscription details such as authentication information or a service provider subscription confirmation token for one or more OTT sources. The OTT sources may be, for example, video streaming services or social media services that may or may not be affiliated with the cable television service provider. Although FIG. 1 illustrates the profile data 140 as being directly accessed by the cable service provider server 120, any or all of the profile data 140 may be additionally or alternatively stored on any of the subscriber's electronic devices and/or on any remote data storage facility.

Figure 2:
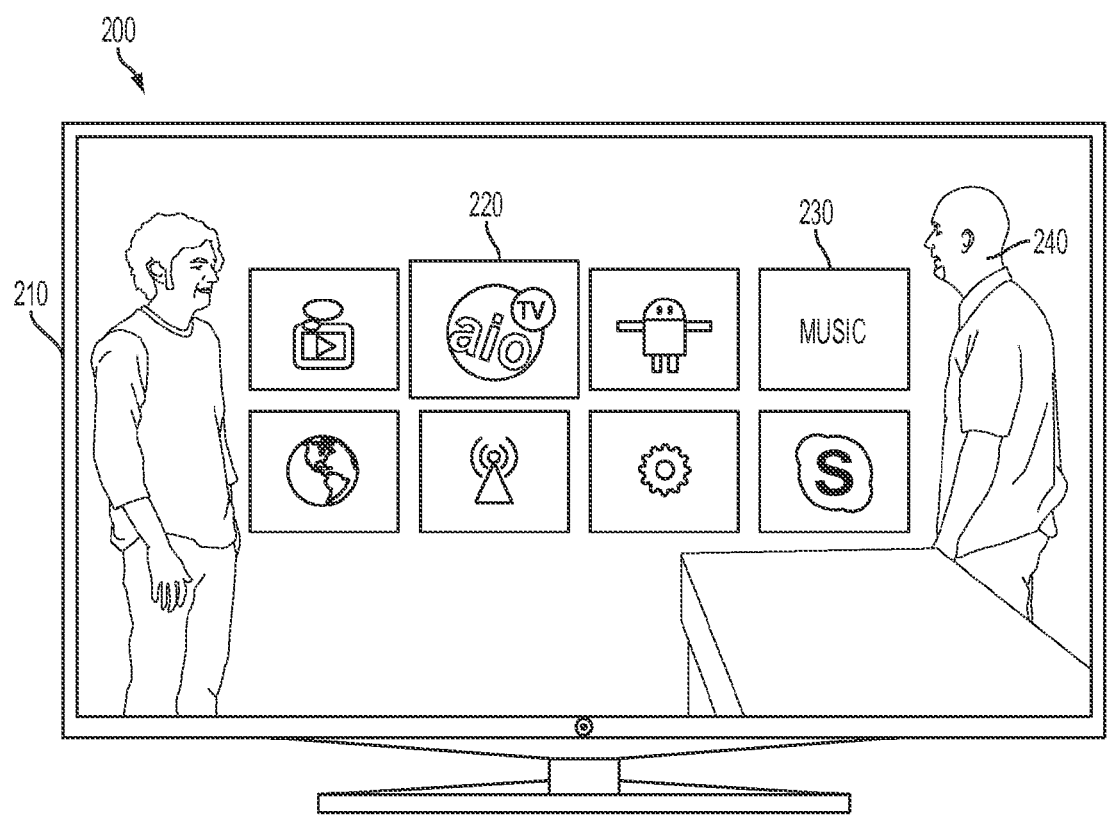
FIG. 2 illustrates an example of a home screen for an integrated video content delivery system.

FIG. 2 illustrates an example of a home screen 200 that may be served to a display of a consumer's electronic device via an integrated video content delivery system such as that described above. Optionally, the home screen may include a background portion 210 and a foreground portion 220 that obscures at least a portion of the background portion. The background portion, if provided, may display a feed of a broadcast or subscription-based channel from the cable television service provider. The feed displayed in the background may correspond to the channel to which the cable service provider set top box (element 110 in FIG. 1) is set, or it may be a default channel such as a designated "home" channel that is used in a closed circuit system such as a hotel or entertainment venue. The media center set top box may be programmed to process the background feed so that it is displayed with low brightness or in other muted format that is not as clear or as bright as the original feed.

The foreground portion or another portion of the home screen displays a menu 240 of user-selectable inputs for various programming services, at least some of which are provided by OTT sources. The services may be presented as icons, as shown, with various icons corresponding to an Internet Protocol (IP) address of a website or to a software application (sometimes referred to as an app) installed on the set-top box. At least some of the services will be associated with third party content available via an IP address. The available apps may include OTT service apps 230 that provide addresses for, and/or which facilitate access to, various sites where video content is available. Examples include social media apps (e.g., Facebook, Vine or Instagram), video sharing apps (e.g., YouTube and/or apps for broadcast network sites such as NBC.com and ABC.com), and subscription-based video content delivery apps (e.g., Netflix or Hulu). The icons or other channel representations included in the user-selectable menu may correspond to a package of content to which the user has purchased a subscription from the cable service provider, to one or more OTT content sources or cable channels that the user has designated as being a favorite channel, and/or to one or more cable channels or OTT sources that the cable service provider desires to promote to the user.

In addition, at least one of the user-selectable inputs may, when selected, launch an integrated programming guide app 220 that displays a programming guide screen rather than an external source. An example programming guide screen will be discussed below in the context of FIG. 3. When the user turns on the display of an electronic device and/or media player pass through box, the system may retrieve the content menu from the cable service provider via the communications network and display it in the foreground or otherwise to the user.

The consumer's media player and/or the cable provider's server may include computer-readable instructions that, when executed, cause the electronic device to display the home screen as described above. The instructions may include, for example, a launcher application that implements a rule set to retrieve the menu of user-selectable icons from the cable service provider server and present them on the home screen. The rule set may include a rule to always apply one or more default app icons (such as a programming guide icon, or an icon for one or more preferred sources), along with one or more app icons that correspond to user-selected settings. Example icons include icons for apps that the user of the media player box wants to integrate with the cable service; icons corresponding to channels, packages or other services to which the user subscribes; or icons corresponding to apps, channels or other services that the cable service provider designates for promotion to the user. The instructions also may include a programming guide application that generates an integrated programing guide for the cable service provider content and OTT content.

Optionally, the app icons displayed by the launcher application may vary based on the device on which the home screen is displayed and/or the subscriber's subscription status for the various services associated with the apps. For example, to access the content delivery system, the user of the device may be required to log into the device or app using an authentication credential such as a user name and password. Once logged in, the user may enter profile data, or the launcher application may cause the device to access locally or remotely stored profile data, that includes information that identifies the type of device being used. Alternatively, the launcher application may include instructions that cause the system to identify device information by reading locally stored profile information that is embedded in the device itself. Before selecting an icon to display on the home screen, the launcher application may identify a service (such as a content source) associated with the icon, identify the user, and identify the device. Before permitting an icon to be displayed on the home screen, the application may access a local or remote authorization service that compares the identified data to authentication credentials to ensure that the user and/or the device are authorized for the service. If the device and/or user lack authorization for the service, then the launcher application will not permit that service's icon to be displayed.

Figure 3:
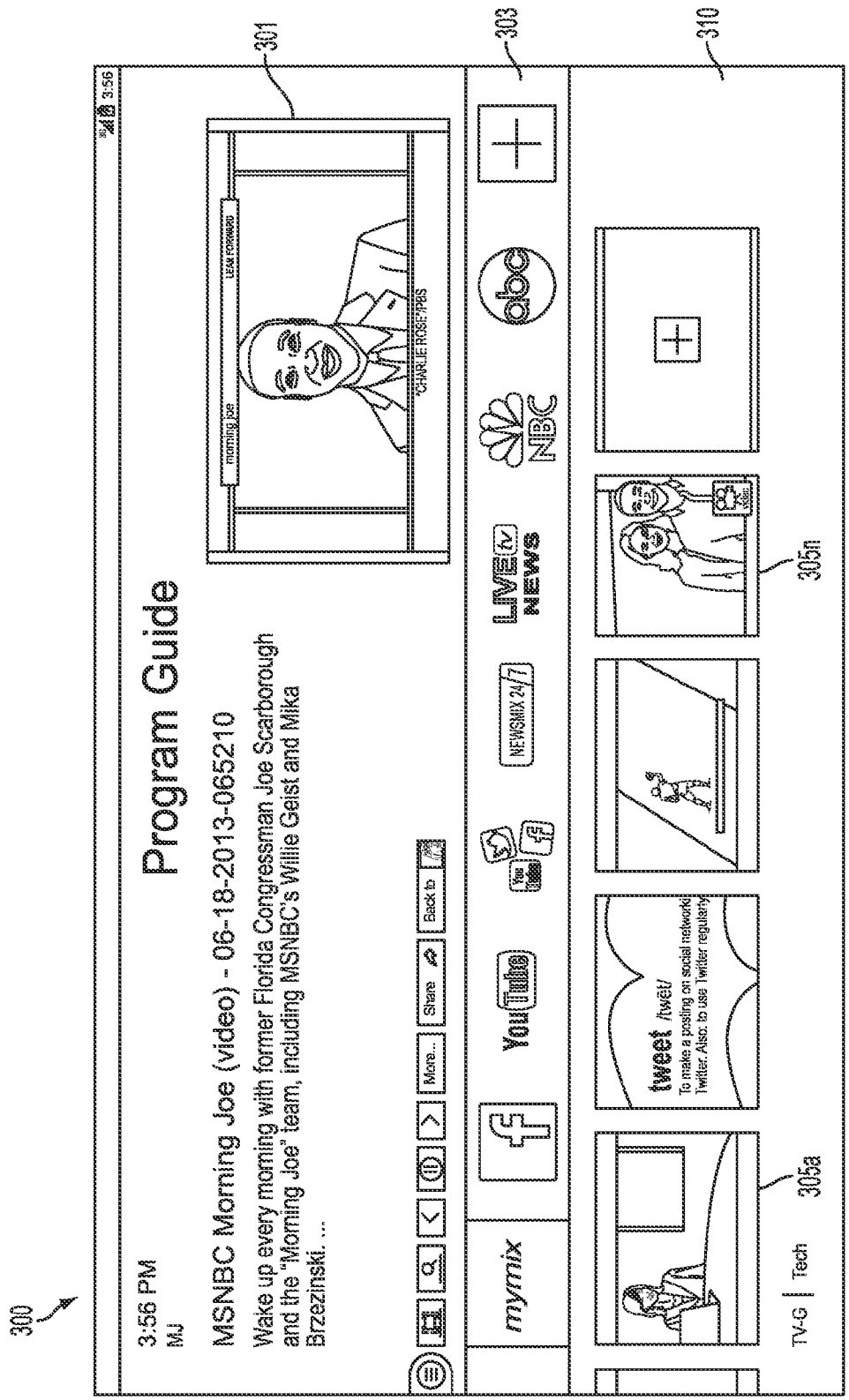
FIG. 3 illustrates an example of a programming guide screen for an integrated video content delivery system.

If, from the home screen, the user selects the programming guide app icon 220, a programming guide application on the user's device and/or a remote server may cause the user's device to display a unified programming guide interface. FIG. 3 illustrates an example of a unified programming guide interface 300. A first portion of the interface is a media player 301 that displays video corresponding to a cable television channel to which the user's cable service provider set top box is set or which the cable service is serving to the user via a remote server. Alternatively, the media player may display video from an OTT source that the user has selected. If the user implements a command via the interface or via a connected set top box to change the cable channel, or if the user or selects another OTT source via the programming guide, then the media player 301 may update and display the video that is being transmitted on the newly-selected channel or received from the newly-selected OTT source. Alternatively, the media player may display a thumbnail or other fixed image or text corresponding to such content. A second portion of the interface will include a channel selector 303 that displays identifying information for a set of channels that are available for the viewer to view. The channels will include broadcast and/or subscription-based channels from the cable service provider, as well as one or more channels from OTT sources, in a seamless format that does not require the user to change the interface other than to scroll or otherwise move among the channels. The available channels may correspond to a package of channels that the cable service provider provides to the user, along with channels of OTT content that the user is permitted to access.

As the user scrolls through the available channels, the programming guide interface will also include an asset listing interface 310 that displays a set of available content on a featured one of the available channels. The featured channel whose content is displayed in the asset listing interface 310 may correspond to the channel that is in a first position in the channel selector 303, at a different standard position, or at a position corresponding to a user selection. Each OTT content asset may be associated with metadata that includes an address of an OTT source where the content asset (i.e., video) is available. When a user selects an asset from the asset listing interface, the box or another part of the system may use the address to identify the OTT source, retrieve the asset from the asset's corresponding OTT source or connect to an external media player that is available at the asset's corresponding delivery address, and cause the video asset to be displayed via the media player 301 or in a full screen format.

Figure 4:
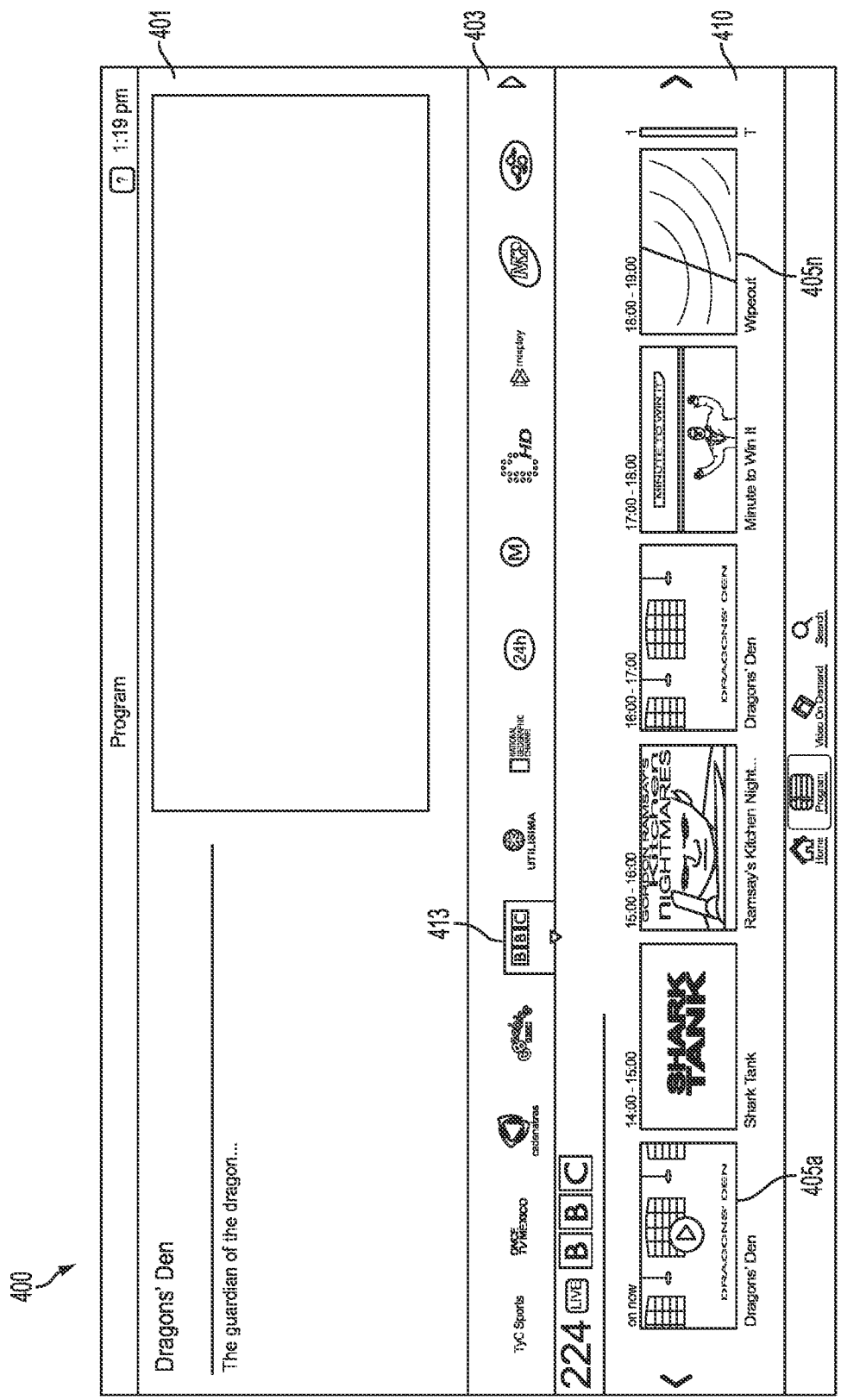
FIG. 4 illustrates an additional example of a programming guide screen for an integrated video content delivery system.

The example of FIG. 3 shows an example programming guide where the asset listing interface lists available on-demand assets 305a . . . 305n (i.e., videos) from a selected OTT source. FIG. 4 shows an embodiment of the programming guide interface 400 in which the user has selected a cable broadcast channel 413 from the channel selector 403. In this situation, when a user selects a channel 413, the asset listing interface 410 will display a menu of upcoming programs 405a . . . 405n on the selected channel in chronological order, optionally with start, stop and/or run length times. Optionally, in the asset listing interface 410, the menu listing for the program that is currently being broadcast on the selected channel may include a play input that a user may select to cause the program to be displayed via the media player 401 or in a full screen format.

Figure 5:
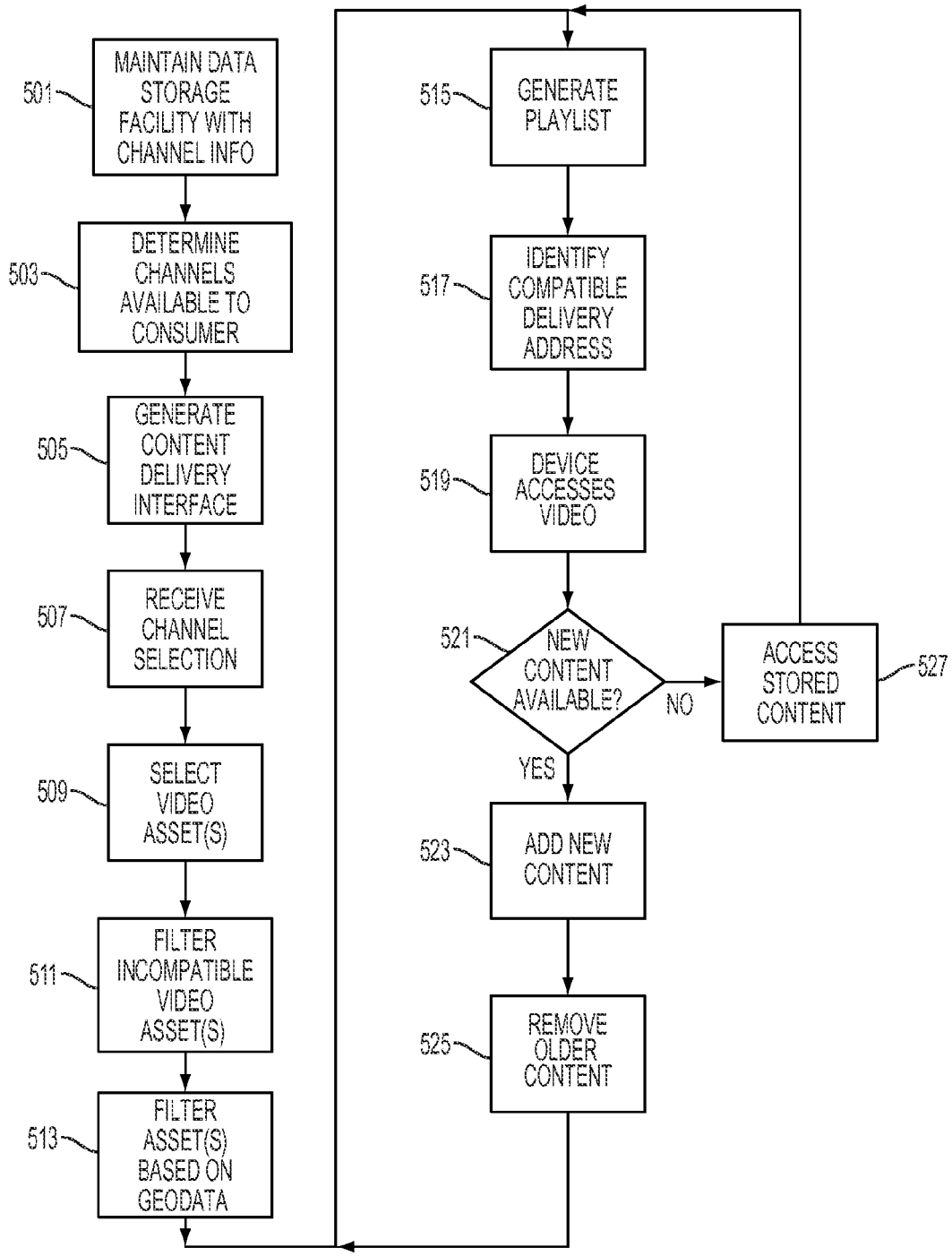
FIG. 5 is an example of a process flow for a video content delivery system.

FIG. 5 is a flowchart illustrating various steps that a multi-platform video content delivery system may implement. A data storage facility of the system will hold data for a set of available video channels 501 and one or more video assets that are available via the channel. Some or all of the data storage facility may be maintained on a local electronic device of a consumer, while some or all of the data storage facility may be maintained on a remote memory device, such as a cable television service provider data storage facility. Some of the video channels will be content sources that are controlled by a multi-channel video service provider, such as a cable television service provider, such as traditional broadcast and cable channels whose delivery to the consumer is part of a cable television service package. Other video channels in the set will be OTT content sources that are not under any control of the service provider, such as third party audio or video streaming services, on-demand video sharing websites, and social media sites on which members may share video content.

The system will generate and cause a display of the consumer's electronic device to display a content delivery interface 505, such as the interface 300 illustrated in FIG. 3. To determine which channels to include in the content delivery interface, the system may determine a set of channels that are available to the consumer 503. The identification of these channels may be maintained by the video service provider in a user profile in the data storage facility, and/or a portion of it may be maintained in a memory of the user's electronic device. To be available to the consumer, the user's profile data may include data indicating that the user has subscribed to a package of channels, and some or all channels that are included in the package may be listed in the content delivery interface. For OTT sources, if the OTT source requires an authentication credential in order to serve videos, the system's rule set may require that the user profile data include the authentication credential. Before including the channel in the listing, the system also may send a signal to the OTT source to verify that the authentication credential is valid and will actually provide access to the videos at the OTT source. In this way, the content delivery interface will only include channels that the user is actually permitted to view, whether it be because the user has subscribed to the channels via the video service provider or because the user has subscribed to the relevant OTT service.

The consumer may use the content delivery interface to select channels for viewing on the display. The available channels may be presented in channel selector interface, such as interface 303 of FIG. 3. The channels will include some channels that are served by the multi-channel video service provider, while others channels will be served by OTT sources.

Referring again to FIG. 5, when the system receives a consumer's selection of one of the available channels 507, the system will access a playlist of available video assets for the channel and select a video asset 509 to present to the consumer via the user interface. The data storage facility may include the data for available video assets on each channel. This data will not necessarily include the video assets themselves, but rather will include programming guide data describing the video asset such as title, run time and genre. For video assets available from OTT sources, the data will also include one or more delivery addresses where the video assets are available to be served by the OTT source. The delivery address may be, for example, an IP address where the OTT source makes the video asset available for streaming. The data storage facility also may include compatibility data, such as a file type or rights management data, that the content delivery system may use to assess whether the asset as served by the OTT source at the delivery address is compatible with the device on which the consumer is attempting to view the asset. For example, the compatibility data may include a device type, a resolution capability of the device, or an authentication credential for a user of the device.

Optionally, before the consumer selects a video asset, and before the consumer selects a channel or when the system displays a channel listing to the consumer, the system may generate the playlist of available video assets 515 such that the playlist only includes assets that are compatible with the user's electronic device. As a precursor to or as part of generating the playlist 515, the system identify may available video assets on the channel to be candidates for inclusion in the playlist, while filtering any assets that are not available from any delivery address that do not serve the asset in a format that is compatible with the user's device type 511. The system may do this with any suitable method, such as by applying a compatibility rule to metadata for a candidate asset and identifying data for the user or the user's device. For example, the metadata for the video asset may include a file or media player type, and the compatibility rule may state that the system should only include the asset in the playlist if the user's device is able to play the file/player type. As another example, if the user's device is capable of playing videos at a certain format (such as 720 p or 1080 p), then if multiple sources are available the system may select the asset and delivery address that provides the asset in a format matching a format that the device is capable of playing. The device's format may be known based on system knowledge of the device, or it may be stored in the user's profile data.

Optionally, to determine whether to include a video asset in the playlist, if the system's data for a candidate video asset includes a geographic restriction, the system may determine a current location for the user's device using geographic positioning system (GPS) or equivalent data that it retrieves from the user's device, and the system may filter any candidate assets whose geographic data dues not meet the criteria of the restriction. In this way, only those assets for whom the device's current location does not violate the geographic restriction will be included in the playlist.

Before the device will actually display the video asset to the consumer, the system may identify a device type for the user's device, and use the device type data to determine (based on information in the data storage facility) a delivery address from which the first video asset may be served in a format that is compatible with the user's device type. The user's electronic device may then access the video as served by the determined delivery address and display the video to the user via the user interface 519. In this way, the video service provider can ensure that the consumer only views videos that are compatible with the consumer's device, and that OTT videos are served directly by the OTT source.

Optionally, to expedite the generation and display of playlists, when the system generates a playlist of available content for any channel, the system may store that playlist in the user's device's memory and/or in a remote data storage facility. The system may then make this stored playlist available the next time that the user selects the channel that is associated with the playlist. Upon user selection of a channel, or periodically when the user is online or offline, the system may determine whether new content is available for the channel 521. The system may do this using any suitable means, such as by periodically accessing and analyzing the content available at an OTT source's website, or by receiving a notification from an OTT source via a syndication service or other content feed. If new content is available, the system may add the new content to the playlist 523 and optionally remove older content from the playlist 525 to generate an updated playlist 515. For example, the system may apply a rule to include a specified number of video assets in the playlist, and when new content is available it will add the new content while deleting older content so that only the specified number of assets remains in the playlist. If new content is not available, or if the system has already identified the new content, then the system may generate the playlist using stored content data for the channel 527.

In many situations, when selecting videos for inclusion in a playlist for a channel 509, a wide variety of videos may be available from the channel's source. If so, the system may apply rules that include one or more personalization criteria to determine which of the available videos to include in a playlist. The personalization criteria may include stored data relating to the user's preference for certain titles, genres, actors, producers or other characteristics of videos; data relating to the user's prior viewing habits; or data relating to certain videos or types of videos that the video service provider designates for promotion to the consumer. For example, if the OTT source is a subscription based video service such as Netflix or Hulu, and if the stored data includes that the user has watched an episode or sequence of episodes of a certain program via that service or another service, then the system may select the next episode in the sequence for inclusion in the playlist. The system may monitor the OTT source to determine when new videos are posted at the OTT source. If so, then when creating the playlist the system may include a sequence of the new videos in the playlist. As another example, if the video service provider desires to promote an upcoming episode of a program on a cable channel, the playlist may include previous episodes of that program that are available via an OTT source.

As another example, if the OTT source is a social media sharing site, the personalization criteria may include rules to show videos that are posted by particular individuals who are connected to the user on the social media sharing site. The user may provide the system with connection information—such as an authentication credential and/or feed address—for a social media feed. If so, the system may monitor the social media feed to identify any video assets that are linked in the feed. The video assets may be served by the social media service, or the social media service may merely publish links to the videos as served by one or more other OTT sources. When creating the playlist 515, the system may create the playlist to include a sequence of recently-linked video assets from the feed. When the user selects a channel that contains the playlist, it may present, via the user interface, a playlist that includes the sequence of recently-linked video assets as served by over-the-top video content sources As another option, the system may present a search field that the user may use to enter one or more criteria to search for available videos from multiple sources. The search field may accept any information such as title, genre, actors, producers, OTT source identifiers or other criteria. The search function may be provided by the video service provider, or it may be a third party search function that is made available via the content delivery interface. When the system generates or receives search results, if the search results include links to video assets then when selecting video assets to include in a playlist 509 it may include some or all of the assets that are linked in the search results. To determine which of the search results' videos to include in the playlist, the system may apply any suitable criteria, such as the compatibility rules, geographic restrictions and/or personalization criteria discussed above.

In another embodiment, the system may automatically search for relevant videos from one or more OTT sources based on information provided by a subscriber via a control device. For example, a subscriber's mobile electronic device may include any now or hereafter known audio recognition service to identify a song, television show, or movie that is playing within an audial reach of the device. When the device detects the sound, it may recognize the audio content and determine identifying information for it (such as by song title and artist). Such recognition services are known and not new. However, in a novel feature, the device may send this information to the system's search engine, and the system may search for OTT sources that contain videos that are related to the audio content. The system may then return a menu of these OTT-sourced videos, and it may automatically generate a playlist of the videos for the subscriber to view via the programming interface.

When displaying videos in a playlist, if the channel is a real-time broadcast then the playlist may include start times, stop times, and/or run times for the videos. An example of this is shown in FIG. 4, where start times and end times are shown for each video in the playlist 410. In contrast, on-demand channels comprising videos served by OTT sources may be arranged in any order, such as newest to oldest (or vice versa), or ordered based on any personalization criteria. An example of a playlist of on-demand videos from OTT sources 310 is shown in FIG. 3. In the example of FIG. 3, the playlist 310 is a personalized playlist for a multi-source channel that includes videos available from multiple OTT sources. The system may generate the personalized playlist for the multi-source channel based on any suitable personalization criteria, such as those described above.

Figure 6:
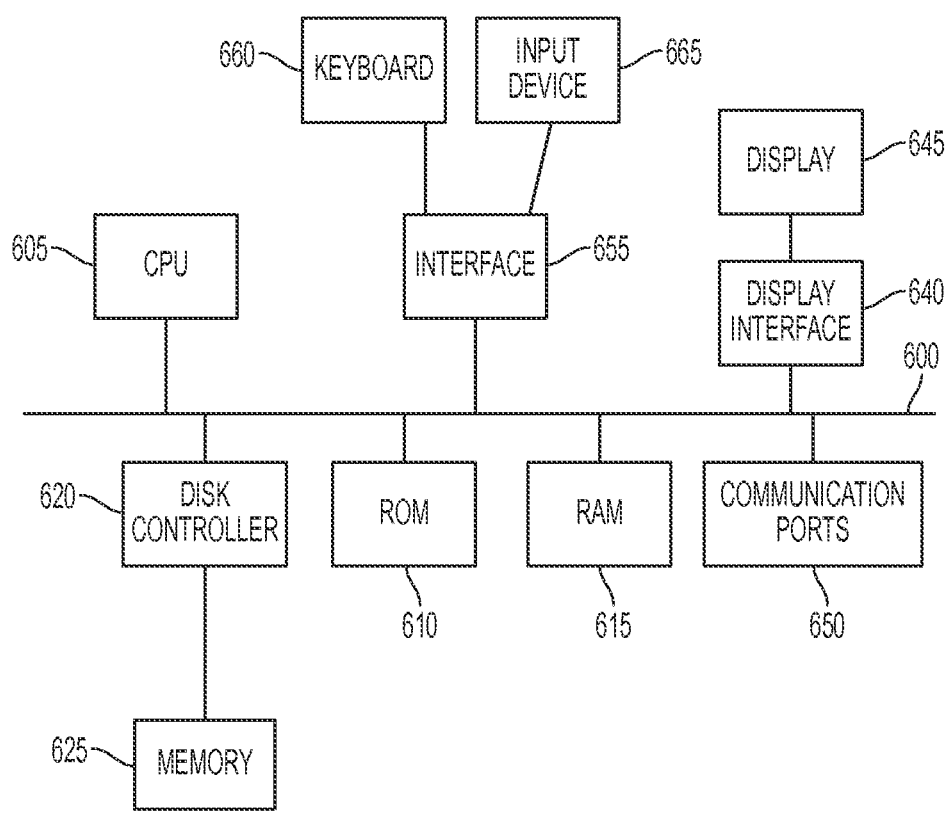
FIG. 6 is a block diagram illustrating various hardware components that may be included in or be used with an integrated content delivery system.

FIG. 6 depicts an example of internal hardware that may be used to contain or implement the various computer processes and systems as discussed above. For example, the user electronic device and/or multi-channel video content service provider system as discussed above may include hardware architecture such as that illustrated in FIG. 6. An electrical bus 600 serves as an information highway interconnecting the other illustrated components of the hardware. CPU 605 is a central processing unit of the system, performing calculations and logic operations required to execute a program. CPU 605, alone or in conjunction with one or more of the other elements disclosed in FIG. 6, is a processing device, computing device or processor as such terms are used within this disclosure. When this disclosure and the associated claims use the term "processor," unless specifically stated otherwise it is intended to include either a single processor or one or more processors from a group of processors. Read only memory (ROM) 610 and random access memory (RAM) 615 constitute examples of memory devices.

A controller 620 interfaces with one or more optional memory devices 625 that service as date storage facilities to the system bus 600. These memory devices 625 may include, for example, an external disk drive, a hard drive, flash memory, a USB drive or another type of device that serves as a data storage facility. As indicated previously, these various drives and controllers are optional devices. Additionally, the memory devices 625 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

A display interface 640 may permit information from the bus 600 to be displayed on the display 645 in audio, visual, graphic or alphanumeric format. Communication with external devices may occur using various communication ports 650. A communication port 650 may be attached to a communications network, such as the Internet, a local area network or a cellular telephone data network.

The hardware may also include an interface 655 which allows for receipt of data from input devices such as a keyboard 660 or other input device 665 such as a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for providing video content to a subscriber, comprising:
    a processor; and
    a computer-readable medium comprising programming instructions that are configured to cause the processor to implement a content delivery interface at an electronic device, wherein the programming instructions comprise instructions to:
        present an identifying symbol for each user-selectable channel of a set of user-selectable channels in a first row of the content delivery interface, the user-selectable channels being served by a plurality of different over-the-top video content sources to which a user subscribes and are not under any control of a service provider;
        present a first playlist of first identifying information for video assets exclusively available from a first channel of the user-selectable channels in a second row of the content delivery interface concurrently with the presentation of the identifying symbols for the set of user-selectable channels in the first row of the content delivery interface;
        receive a user input selecting the identifying symbol associated with a second channel from the set of user-selectable channels in the first row of the content delivery interface that is of interest to the user;
        in response to the reception of the user input, dynamically replace the first playlist with a second playlist of second identifying information for video assets exclusively available from the selected second channel, the second playlist being presented in the second row of the content delivery interface concurrently with the presentation of the identifying symbols for the set of user-selectable channels in the first row of the content delivery interface;
        select, from the second playlist, second identifying information associated with a first video asset to be presented to the user via the content delivery interface;
        identify a device type for the electronic device;
        identify a first group of delivery addresses associated with an over-the-top video content source of the plurality of over-the-top video content sources that serves the selected second channel, wherein each delivery address in the group is capable of serving the first video asset;
        select, from the group of delivery addresses, a delivery address from which the first video asset may be served; and
        cause the first video asset as served from the delivery address to be presented in a video display portion of the content delivery interface concurrently with the presentation of the identifying symbols for the set of user-selectable channels and the second playlist in the content delivery interface;
    wherein each of the first and second identifying information comprises at least one of visual images and graphic symbols.

2. The system of claim 1, wherein the programming instructions that cause the processor to implement the content delivery interface also comprise instructions to:
    generate the first or second playlist by identifying a plurality of available video assets to be candidates for inclusion in the playlist while filtering any assets that are not available from any delivery address in a format that is compatible with the device type.

3. The system of claim 2, wherein the programming instructions that cause the processor to generate and display the content delivery interface also comprise instructions to:
    determine a current location for the electronic device;
    identify a plurality of available video assets as candidates for inclusion in the second playlist; and
    for each of the available video assets, identify whether the available video asset is associated with a geographic rule, determine whether the current location satisfies the geographic rule, and include in the second playlist only those available video assets for whom the current location satisfies the associated geographic rule.

4. The system of claim 1, wherein the programming instructions that cause the processor to generate and display the content delivery interface also comprise instructions to:
    receive new content from one or more of the over-the-top video sources; and
    update the second playlist to replace older content with the new content.

5. The system of claim 1, wherein the programming instructions that cause the processor to generate and display the content delivery interface also comprise instructions to generate the second playlist by selecting, from a video content database containing metadata for a plurality of candidate video assets, a plurality of video assets that satisfy one or more personalization criteria for the user.

6. The system of claim 1, wherein the programming instructions that cause the processor to generate and display the content delivery interface also comprise instructions to:
receive, from the user, connection information for a social media feed;
monitor the social media feed to identify any video assets that are linked in the feed;
create a third playlist comprising a sequence of recently-linked video assets from the feed; and
in response to a user selection of a channel that contains the created third playlist, cause identifying information for the recently-linked video assets as served by over-the-top video content sources to be presented to the user via the content delivery interface.

7. The system of claim 1, wherein the programming instructions that cause the processor to generate and display the content delivery interface also comprise instructions to:
receive, from the user, subscription information for a third party video content source;
monitor the third party video content source to identify any new video assets that are made available to the user;
create a fourth playlist comprising a sequence of new video assets from the third party video source; and
in response to a user selection of a channel that contains the created fourth playlist, cause identifying information for the new video assets as served by the third party video content source to be presented to the user via the content delivery interface.

8. The system of claim 1, wherein the programming instructions that cause the processor to generate and display the content delivery interface also comprise instructions to:
present a search field to a user;
receive a search query via the search field;
in response to the query, cause a search service to identify a plurality of responsive video assets from over-the-top content sources;
create a fifth playlist comprising a sequence of the responsive video assets from the feed; and
in response to a user selection of a channel that contains the created fifth playlist, cause identifying information for the sequence of the responsive video assets as served by over-the-top video content sources to be presented to the user via the content delivery interface.

9. The system of claim 1, wherein the programming instructions that cause the processor to implement the content delivery interface also comprise instructions to:
select a first plurality of user-selectable channels by accessing a user profile and identifying a package of channels to which the user subscribes, and designating the first plurality of user-selectable channels as those channels served by the multi-channel service provider as part of the package; and
select a second plurality of user-selectable channels based on user profile data so that at least one of the second plurality of user-selectable channels includes an over-the-top content source for which the user profile includes an authentication credential.

10. A system for providing video content to a subscriber, comprising:
one or more processors; and
a computer-readable medium comprising programming instructions that, when executed, cause one or more of the processors to implement a content delivery interface at an electronic device by:
presenting an identifying symbol for each user-selectable channel of a plurality of user-selectable channels in a first row of the content delivery interface, the user-selectable channels being served by a plurality of different over-the-top video content sources to which the user subscribes and are not under any control of the service provider;
presenting a first playlist of first identifying information for video assets available from a first channel of the user-selectable channels in a second row of the content delivery interface concurrently with the presentation of the identifying symbols for the plurality of user-selectable channels in the first row of the content delivery interface;
receiving a user input selecting the identifying symbol associated with a second channel from the plurality of user-selectable channels that is of interest to the user;
in response to the user input, performing the following operations:
identifying a device type for the electronic device; and
generating a second playlist by:
identifying a set of video assets that are available for the second channel,
selecting, from the set of video assets, a subset of the video assets that satisfy one or more personalization criteria, and
removing, from the subset, any video assets that are not available from any delivery address in a format that is compatible with the device type;
causing the second playlist to include second identifying information for any remaining video assets in the subset;
dynamically replacing the first playlist with the second playlist comprising the second identifying information for the remaining video assets in the subset, the second playlist being presented in a second row of the content delivery interface concurrently with the presentation of the identifying symbols for the plurality of user-selectable channels in the first row of the content delivery interface;
identifying, from the second playlist, second identifying information associated with a first video asset to be presented to the user via the electronic device;
determining a delivery address from which the first video asset may be served in a format that is compatible with the device type; and
causing the first video asset as served from the delivery address to be presented in the content delivery interface concurrently with the presentation of the identifying symbols for plurality of user-selectable channels and the second playlist in the content delivery interface;
wherein each of the first and second identifying information comprises at least one of visual images and graphic symbols.

11. The system of claim 10, further comprising instructions to:
access a user profile; and
select the plurality of user-selectable channels based on user profile data so that at least one of the plurality of user-selectable channels includes an over-the-top content source for which the user profile includes an authentication credential.

12. A method of providing video content to a subscribing user, comprising, by one or more processors:
causing an electronic device to output a content delivery interface that comprises
a first row in which an identifying symbol for each user-selectable channel of a plurality of user-selectable channels is presented, the user-selectable channels being served by over-the-top video content sources that are not under any control of a service provider of the content delivery interface, and
a second row in which a first playlist of first identifying information for video assets available from a first channel of the user-selectable channels is presented concurrently with the presentation of the identifying symbols for the plurality of user-selectable channels;
receiving a user input selecting the identifying symbol associated with a second channel from the plurality of user-selectable channels in the first row that is of interest to the user;
in response to the user input, dynamically replacing the first playlist with a second playlist of second identifying information for video assets available from the selected second channel;
selecting, from the second playlist second identifying information associated with video asset available from the second channel that is to be presented to the user via the content delivery interface;
identifying a device type for the electronic device;
identify a first group of delivery addresses associated with an over-the-top video content source of the over-the-top content sources that serves the selected second channel, wherein each delivery address in the group is capable of serving the first video asset;
selecting, from the group of delivery addresses, a delivery address from which the first video asset may be served; and
causing the first video asset as served from the delivery address to be presented in a video display portion of the control delivery interface concurrently with the presentation of the identifying symbols for the plurality of user-selectable channels and the second playlist in the content delivery interface;
wherein each of the first and second identifying information comprises at least one of visual images and graphic symbols.

13. The method of claim 12, further comprising generating the second playlist by:
identifying a plurality of available video assets to be candidates for inclusion in the second playlist; and
filtering any assets that are not available from any delivery address from which the filtered asset may be served in a format that is compatible with the device type.

14. The method of claim 12, further comprising:
determining a current location for the electronic device;
identifying a plurality of available video assets as candidates for inclusion in the second playlist; and
for each of the available video assets, identifying whether the asset is associated with a geographic rule, determining whether the current location satisfies the geographic rule, and including in the second playlist only those assets for whom the current location satisfies the associated geographic rule.

15. The method of claim 12, further comprising:
receiving new content from one or more of the over-the-top video sources; and
updating the second playlist to replace older content with the new content.

16. The method of claim 12, further comprising generating the second playlist by selecting, from a video content database containing metadata for a plurality of candidate video assets, a plurality of video assets that satisfy one or more personalization criteria for a user of the electronic device.

17. The method of claim 12, further comprising:
receiving connection information for a social media feed of a user of the electronic device;
monitoring the social media feed to identify any video assets that are linked in the feed;
creating a sequence comprising recently-linked video assets from the feed;
determining that the user selection of the channel corresponds to a channel that contains the second playlist; and
causing the sequence of recently-linked video assets from the feed as served by over-the-top video content sources to be presented via the content delivery interface.

18. The method of claim 12, further comprising:
receiving, from the user, subscription information for a third party video content source;
monitoring the third party video content source to identify any new video assets that are made available to the user;
creating a third playlist comprising identifying information for a sequence of new video assets from the third party video source;
determining that the user selected a channel that contains the third playlist; and
causing the sequence of new video assets as served by the third party video content source to be presented via the content delivery interface.

19. The method of claim 12, further comprising:
presenting a search field to a user of the electronic device;
receiving a search query via the search field;
in response to the query, causing a search service to identify a plurality of responsive video assets from over-the-top content sources;
creating a fourth playlist comprising identifying information for a sequence of the responsive video assets from the feed;
determining that the user selected a channel that contains the fourth playlist; and
causing the sequence of the responsive video assets as served by over-the-top video content sources to be presented via the content delivery interface.

20. The method of claim 12, further comprising:
accessing a profile of a user; and
selecting the plurality of user-selectable channels based on data in the profile so that at least one of the plurality of user-selectable channels includes an over-the-top content source for which the profile includes an authentication credential.

* * * * *